Dec. 6, 1966 D. J. FOOTE 3,289,830
DISPLAY CARD MOUNTED RETAINER AND PACKAGING DEVICE
Filed Jan. 24, 1966 3 Sheets-Sheet 1

INVENTOR
DANIEL J. FOOTE

BY *Morsell & Morsell*

ATTORNEYS

Dec. 6, 1966     D. J. FOOTE     3,289,830
DISPLAY CARD MOUNTED RETAINER AND PACKAGING DEVICE
Filed Jan. 24, 1966     3 Sheets-Sheet 2
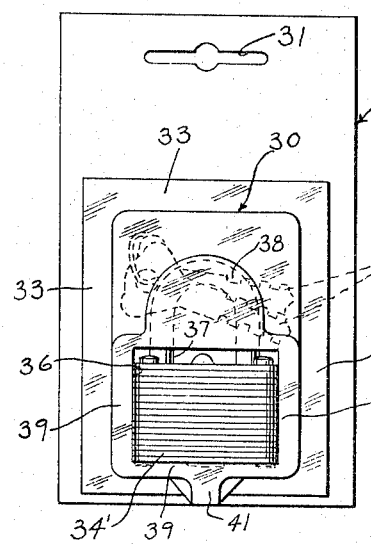
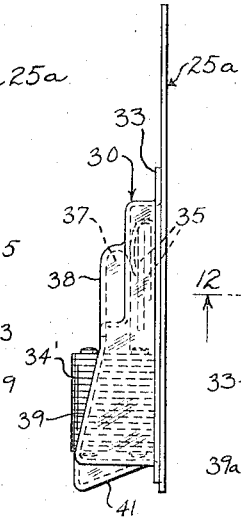
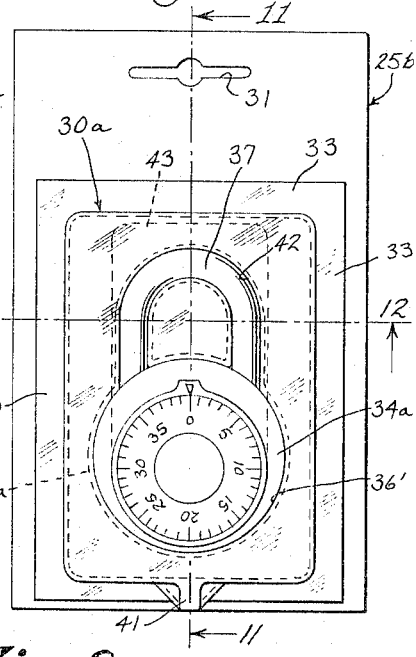
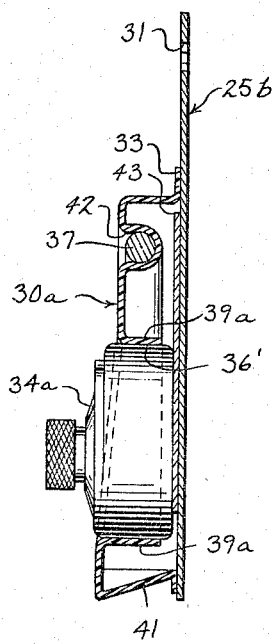
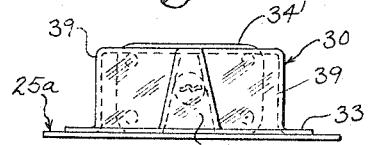
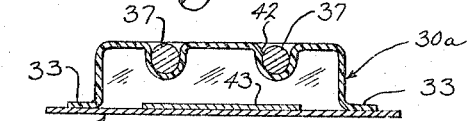
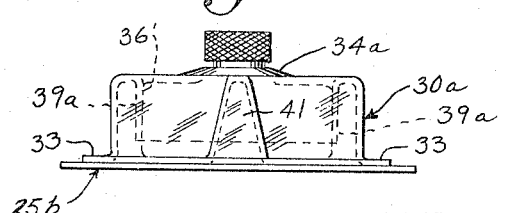
INVENTOR
DANIEL J. FOOTE
BY
*Morsell & Morsell*
ATTORNEYS Dec. 6, 1966   D. J. FOOTE   3,289,830
DISPLAY CARD MOUNTED RETAINER AND PACKAGING DEVICE
Filed Jan. 24, 1966   3 Sheets-Sheet 3

INVENTOR
DANIEL J. FOOTE

BY
*Morsell & Morsell*
ATTORNEYS

United States Patent Office 3,289,830
Patented Dec. 6, 1966

3,289,830
DISPLAY CARD MOUNTED RETAINER AND
PACKAGING DEVICE
Daniel J. Foote, Wauwatosa, Wis., assignor to Master
Lock Company, Milwaukee, Wis., a corporation of
Wisconsin
Filed Jan. 24, 1966, Ser. No. 522,735
9 Claims. (Cl. 206—78)

This invention relates to improvements in display card mounted retainer and packaging devices.

Numerous products are packed in individual cartons in the conventional manner. But with more and more retail stores and dealers now utilizing pegboard display areas with hooks on which to hang these products or display cards containing such products, the trend and growing practice is to package locks, hasps, hardware items, and other articles of merchandise by stapling such products to display cards or by completely covering them with a suitable flexible plastic material which is then glued, pasted, or heat sealed to the display card. The cover or enclosure over these various products is usually of an opaque or transparent flexible material made of acetate, plastic, skin, or glassine. This cover or enclosure is customarily a bubble or blister pack made of cellulose acetate butyrate or cellulose acetate propionate preformed to an approximate shape of the product, or is so made as to form a suitable domed housing to confine the product and its accompanying keys, screws or accessories within the plastic enclosure on the display card. The bubble or plastic pack serves as the entire covering over the product to be displayed or hung. The other or skin pack arrangement wherein the product or unit is trapped between the card or board and the plastic material is accomplished by having the latter tightly formed around the entire product or part by heat and vacuum. These methods of completely covering the products or goods on display cards nevertheless have several objections, namely, the bubble and blister pack or skin pack over the entire product or unit separates the prospective customer from the touch or feel of the product; the covering or bubble pack, since it is transparent and of a shiny or glossy material, creates a "mirror effect" which often obscures the view of the products or goods displayed; and finally, the product or unit displayed, if heavy or bulky, renders the card top heavy so that it cannot stand and tips over if placed in counter bins.

With the foregoing in mind it is a primary object of the present invention to provide a display card for hardware items which is foldable from a one-piece blank or formed of a single piece card, or of a multi-layer laminated card on which a thermoformed transparent flexible plastic die cut retainer device is mounted and in which the product or item can be securely held but will nevertheless visibly expose the merchandise, the composite display card being especially suited for locks, whether they be of the key type, or combination or hasp, or bike-locks.

A further object of the invention is to provide a display card to which a thermoformed plastic die cut retainer is glued or attached, with the retainer having an opening in its front portion which allows a portion of the lock case or body or major portion of the encased product to project therethrough whereby the product is exposed to the touch or feel of the prospective customer and the exposure and display thereof is accomplished without complete disengagement of the article from the card.

A more specific object of the present invention is to provide a display card for locks, hardware items, and the like formed either from a single card or from a flat one-piece blank, or from a laminated pair of card sections adapted to securely receive a thermoformed flexible plastic die cut retainer device either inserted within the folds of said display card or attached or glued to the face of said display card, with the retainer device having in its front face a partial opening which provides an entrance for keys, screws, or other accessories inserted into the top or bottom of said retainer before the lock or other hardware item is inserted thereinto, whereby the lock or product snugly fits within the plastic container or retainer to complete the package, eliminating any possibility of the keys, screws, or accessories becoming separated from the lock or displayed product.

A further object of the invention is to provide an integral plastic die cut retainer device and display card for locks, hardware items, and the like, in which there is a precise opening in the front of the retainer which permits the lock or product to be snapped thereinto and to be so retained for display purposes, the plastic retainer being formed so that it does not cover the product entirely, and eliminates a glossy plastic covering over a major portion of the product, thereby reducing any "mirror effect" and insuring good visibility of the product.

A further object of the invention is to provide a combined thermoformed flexible plastic die cut retainer device and display card for locks, hardware items and the like, wherein the retainer device is formed on its lower portion with a leg formed sufficiently strong to support the weight of the lock or encased product, whereby the display card may stand upright without toppling, the display assemblage also being susceptible of being mounted on a hook or other means for the upright display of the supported lock or hardware product or item.

Another specific object of the invention is to provide in a display card assemblage, a thermoformed flexible plastic die cut retainer and packaging device having a cut-out opening in its plastic face which allows a lock, hardware item or the like to project through or out of the said opening, whereby a substantially exposed portion of the lock or product can be seen in its true finish and appearance, irrespective of whether the plastic retainer is formed of a different or variously colored translucent or transparent material having special eye appeal.

A further specific object of the invention is to provide in a display card, a face mounted plastic retainer which is so shaped and die cut with an opening therein that it will firmly support a lock, hardware item or the like, and prevent undesired shifting and movement thereof, and still prevent loss or theft of the keys, screws or other attachments or accessories belonging to said product or item, the material of the retainer surrounding the face opening therein impinging against wall portions of the housed item, but being sufficiently resilient to permit entrance of the article into the retainer through said opening.

A further object of the invention is to provide in a display card mounted plastic retainer, an opening in the front face of the plastic die cut retainer which serves as an entrance for a lock or the like carried by the assemblage after the plastic retainer has been mounted on a display card, the constituents of the assemblage being susceptible of being made up, assembled and stored in advance of completing the package by the insertion in the retainer of the lock or merchandise to be displayed.

Still another object of the present invention is to provide in a display card and retainer assemblage of the character described, an opening in the retainer which, besides facilitating the loading of the item to be housed and "feel" access thereto, also serves as a vent for the escape of entrapped moisture should moisture accumulate from processing the display card and/or the displayed device or from the product and merchandise itself, so that there is no need for drying out the moisture, which moisture if not eliminated might cause chemical reactions on the plating of locks or other hardware items displayed.

A further object of the invention is to provide a display card mounted retainer and packaging device which is of very simple construction, which is easy to assemble and load, which forms a protective encasing retainer for a packaged article while attractively displaying the article, which permits a portion of the encased article to be readily viewed and felt, which is strong and durable, and which is well adapted for the purposes described.

With the above and other objects in view, the invention consists of the improved display card mounted retainer and packaging device and its parts and combinations as set forth in the claims, and all equivalents thereof.

In the accompanying drawings in which the same reference characters indicate the same parts in all of the views:

FIG. 7 is a front view of a display card mounted retainer and packaging device assemblage showing within the retainer a key-type warded lock and the accompanying keys, the display card being of single ply and having the peripheral rim of the retainer secured to an outer face portion of the display card;

FIG. 8 is a side view of the showing in FIG. 7;

FIG. 9 is a bottom view of the assemblage shown in FIGS. 7 and 8;

FIG. 10 is a front view of a second modified form of display card mounted retainer and packaging device assemblage with the retainer mounted on the exterior of the front face of the display card and with the retainer housing a commutation lock;

FIG. 11 is a vertical sectional view taken along the line 11—11 of FIG. 10;

FIG. 12 is a transverse sectional view taken along the line 12—12 of FIG. 10;

FIG. 13 is a bottom view of the assemblage shown in FIG. 10;

Figure 1:
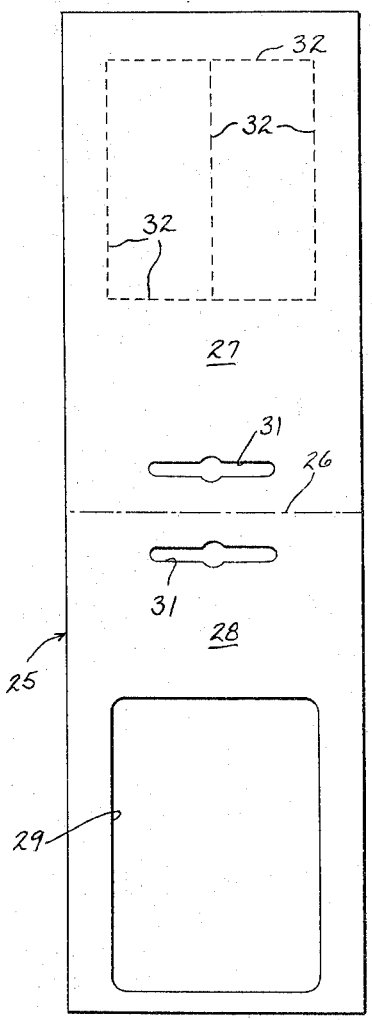
FIG. 1 is a face view of one form of a display card adapted to be medially folded upon itself.

Referring first to the form of the invention shown in FIGS. 1-6, inclusive, of the drawings, the numeral 25 indicates a rectangular display card formed of cardboard, paperboard, or a similar material. In this form of the invention the display card is adapted to be folded medially upon itself along the transverse fold line 26 so that the portion 27 which becomes the back section of a two-ply display card covers the rear of the front or face section 28 and is ultimately secured thereto. In the face section 28 there is a die cut rectangular opening 29 which conforms to the shape and size of the body portion of a retainer 30 which will be described more fully hereinafter. The rear and face sections 27 and 28 of the two-ply display card 25 are formed near the fold line 26 with slots 31 which register in the folded condition of the display card and provide means whereby the display card and its components may be suspended from suitable means on a dealer's pegboard. The rear section 27 of the display card 25 is furthermore provided with lines of perforations or weakening 32 which, in the folded-over condition of the display card, approximately register with the opening 29 in the face section of the display card and provide means whereby the displayed merchandise or hardware may be removed from the composite display card mounted retainer and packaging device by punching out the rectangular opening normally closed by the flaps defined by the lines 32.

Figure 2:
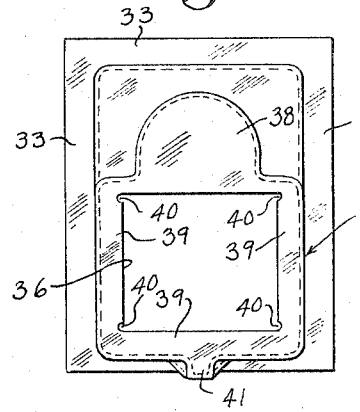
FIG. 2 is a front view of the pre-formed plastic retainer prior to its application to a face of the display card and showing the peripheral flange thereon by which means it is secured onto its companion display card.
Figure 3:
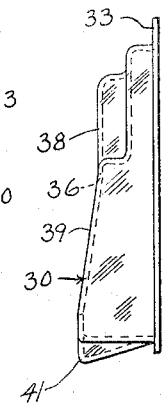
FIG. 3 is a side view of the plastic retainer of FIG. 2.
Figure 4:
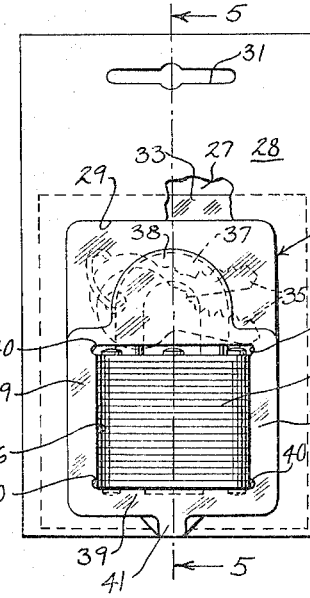
FIG. 4 is a front view of the completely assembled display card and retainer showing the latter housing a key-actuated padlock with the keys therefor within the retainer.
Figure 5:
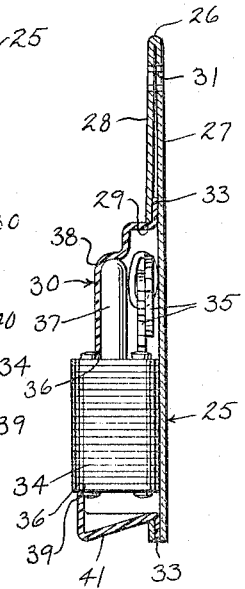
FIG. 5 is a vertical sectional view taken along the line 5—5 of FIG. 4.
Figure 6:
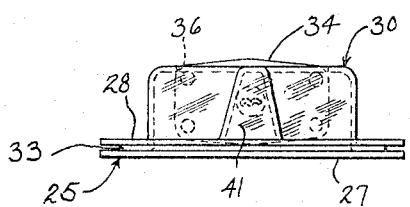
FIG. 6 is a bottom view of the assemblage shown in FIG. 5.

A retainer and packaging device for mounting on the display card 25 is shown in detail in FIGS. 2 and 3 and is indicated generally by the numeral 30. This retainer is in the form of a hollow box shaped generally to conform to the shape of the merchandise item to be housed therewithin on the display card, and its underside is open but the walls surrounding said open underside are surrounded by a horizontal peripheral flange 33. When the retainer 30 is mounted on the two-ply display card 25 of FIG. 1 the annular horizontal flange 33 of the retainer is disposed within the front face opening 29 of the display card and is confined in interposed relation between the two sections of the display card, as best shown in FIGS. 4, 5 and 6. An adhesive may be applied to said flange to secure the retainer in position.

The retainer 30 is preferably formed of any suitable thin transparent or translucent plastic material, colored or uncolored, but it may also be formed of metal or other suitable material. In the particular embodiment illustrated the retainer 30 is designed to receive and display a key-type cylinder padlock 34, together with the keys 35 therefor. When the retainer 30 is mounted on and attached to the display card 25 in the manner described the retainer will project outwardly from the front face 28 of the display card and will completely fill the opening 29 therein. The front of the retainer 30 is provided with an opening 36 (see FIG. 2) which conforms in size and shape to that of the body portion of the article of merchandise to be carried thereby, such as the padlock 34. To house the article of merchandise and its appurtenances within the display card mounted retainer 30, the loose keys or appurtenances 35 are first entered into the retainer 30 through the opening 36 therein and are disposed in a convenient manner as shown. Then, in the case of a padlock 34, the shackle 37 thereof is inserted into the retainer opening 36 and pushed upwardly therein so as to be accommodated by a raised area 38. Then the body portion of the padlock 34 is registered with the display card opening 29 and is pushed therethrough so as to lodge firmly within the main portion of the hollow retainer 30, as shown in FIGS. 4 and 5, with its front surface projecting slightly beyond the front of the retainer 30 so that it is readily visible to a prospective purchaser and is susceptible of being examined by feel. Actually, the opening 36 in the front of the retainer 30 is slightly smaller than the outline of the body portion of the displayed merchandise and when the body portion 34 is pushed through said opening, the lips 39 of the retainer which extend away from the opening 36 will, by virtue of the qualities inherent in the material of the retainer, flex or bow slightly and when the padlock body 34 is in place the lips 39 will resiliently or frictionally engage peripheral wall portions of the padlock body 34 to thus securely hold it in its mounted condition. If desired, there may be notches 40 provided in the material of the lips 39 adjacent the corners of the retainer opening 36 which will serve to make the lips more resilient or flexible.

The bottom wall of the retainer 30 is provided with an intermediately located integral leg 41 which, in cooperation with the lower margin of the display card 25, permits the loaded display card to be stood upright in a stable condition on a display stand or counter, if desired. It should furthermore be noted that the deflected lips 39 will wedge against any rivet or irregularities on the side walls of the mounted lock or other article or merchandise, and the mounting of the article of merchandise within the display card mounted retainer is such that removal of the lock from the display card is prevented, and it is also impossible to remove the housed accessories such as the keys 35. Authorized removal of the housed items from the retainer can be accomplished, in the form of the invention shown in FIGS. 1–6, inclusive, by breaking out the areas on the rear ply of the card defined by the lines 32 and pushing the lock and accessories out of the housing through the openings thus exposed.

The form of the invention shown in FIGS. 7, 8 and 9 of the drawings differs from the form of the invention shown in FIGS. 1–6, inclusive, in several particulars. First, the display card 25a is a single ply card devoid of an opening in its face, but the retainer 30 has its peripheral flange 39 superimposed on the face of the card 25a and it is secured thereto by a suitable adhesive. Secondly, the padlock 34' shown housed within the retainer is a laminated key-type warded padlock. Obviously the retainers of the several forms of the invention herein disclosed should be shaped to conform to the size and proportions of the types of padlocks or articles of merchandise to be carried by the display cards, and within the contemplation of the present invention the various types of padlocks to be borne by the display card assemblage include key-actuated lever locks, bike locks with elongated shackles, etc. For other hardware items or articles of merchandise the retainer is formed to correctly accommodate the particular item, but in all cases the front face of the container is formed with an opening of a substantial size through which the article is introduced, with the opening being surrounded by a resilient lip to frictionally engage side wall portions of the housed item.

Another slight modification of the present invention is shown in FIGS. 10, 11, 12 and 13. Here the display card 25b is again a single thickness card, but the retainer 30a is designed to receive a combination lock 34a whose body portion is of a circular contour. Therefore, the opening 36' in the front face of the retainer 30a is a circular to snugly receive the body portion of the commutation lock 34a. The stock of the front face of the retainer 30a surrounding the opening 36' is downturned, as at 39a, and is yielding or resilient so as to tightly impinge against the circular side wall portion of the body of the combination lock 34a. Instead of entering the shackle 37 through the retainer opening 36' to lodge within the upper portion of the retainer and to be covered thereby, the upper portion of the retainer is formed with a U-shaped recess 42 in which the padlock shackle 37 seats when the body of the padlock is disposed within the retainer. Hence the face of the padlock body, as well as its shackle, are exposed to eye and feel inspection. In this form of the invention the peripheral flange 33 on the retainer seats on the outer face of the display card 25b and is secured thereto by a suitable adhesive. An integral leg 41 is provided on the base portion of the retainer 30a.

FIGS. 10 and 11 best show the manner in which a combination padlock is mounted in the display card and retainer assemblage. An instruction and combination bearing ticket 43 for the specific combination padlock may be inserted into the retainer against the face of the card 25b.

Figure 14:
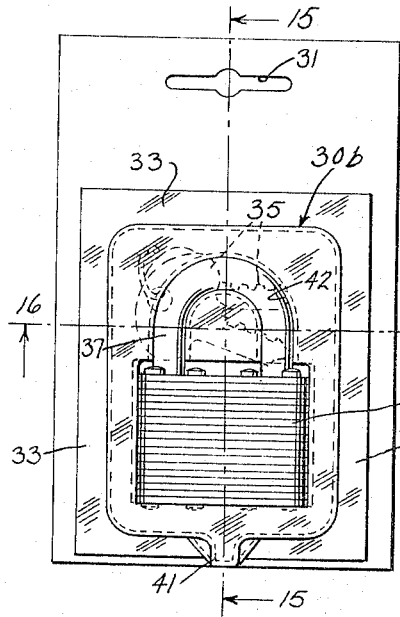
FIG. 14 is a front view of another modified form of display card mounted retainer and packaging device assemblage wherein the retainer is mounted on the front face of a single thickness display card and is adapted to house a cylinder-type warded or lever form of key-actuated padlock with the accompanying keys therefor.
Figure 15:
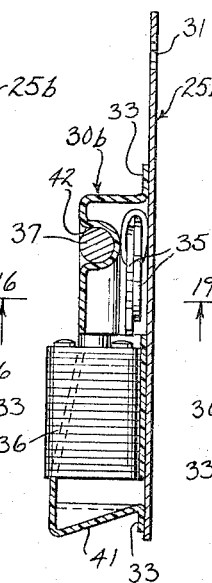
FIG. 15 is a vertical sectional view thereof taken along the line 15—15 of FIG. 14.
Figure 16:
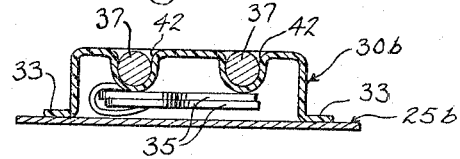
FIG. 16 is a transverse sectional view taken along the line 16—16 of FIG. 14.

In the form of the invention shown in FIGS. 14, 15 and 16 the display card 25b is similar to the display card of FIGS. 10, 11, 12 and 13, but the retainer 30b is designed to receive a cylinder-type warded or lever key-actuated padlock 36 of any desired size and its accompanying keys 35. Said retainer 30b has its upper portion formed, however, with a U-shaped recess 42 to receive the padlock shackle 37 so that, just as in the form of the invention displayed in FIGS. 10 and 11, the padlock shackle, instead of being disposed within the upper portion of the retainer body, is exposed to sight and feel inspection. The peripheral horizontal flange 33 seats on the outer face of the display card 25b and is secured thereto by an adhesive.

Figure 17:
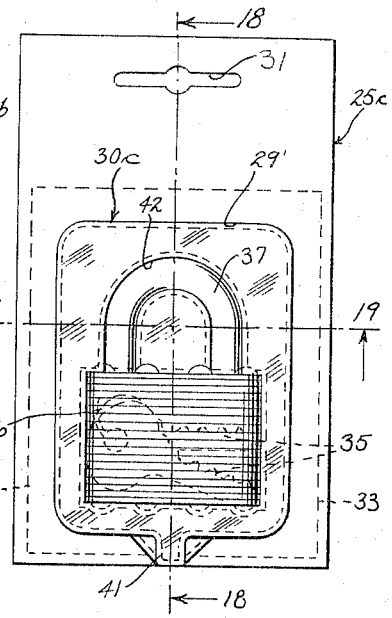
FIG. 17 is a front view of still another modified form of display card mounted retainer and packaging device assemblage wherein the display card is of a single thickness but the peripheral flange on the retainer extends through an opening in the face of the display card and engages and is secured to rear face portions of the display card.
Figure 18:
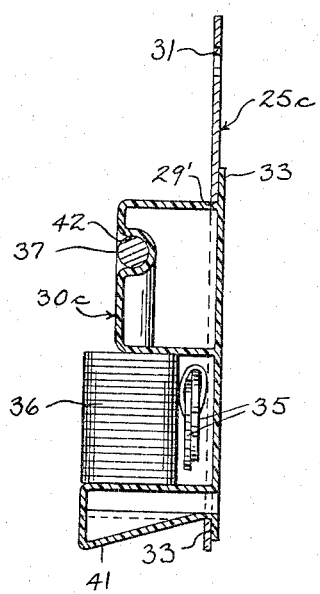
FIG. 18 is a vertical sectional view taken along the line 18—18 of FIG. 17.
Figure 19:
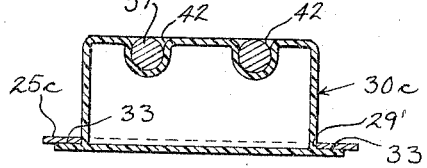
FIG. 19 is a transverse sectional view taken along the line 19—19 of FIG. 17.

Another slightly modified form of the invention is illustrated in FIGS. 17, 18 and 19. The display card 25c is of single ply, but is formed with an opening 29' of a substantial size to approximately correspond to the size and shape of the body portion of the retainer 30c. In this particular form of the invention the peripheral horizontal flange 33 surrounding the base of the retainer is extended through the card opening 29' and is secured to the under or rear surface of the card 25c, as best shown in FIGS. 18 and 19. The inner side of the retainer 30c, because of the card opening 29', must be closed by a wall thereacross, as shown. The retainer is designed to receive a key-actuated lever-type of padlock 36 and, as in several forms of the invention heretofore described, the top portion of the retainer 30c is formed with a U-shaped recess 42 in which the shackle 37 of the padlock seats and is thus exposed for sight and feel inspection. As also shown in FIGS. 17 and 18, the keys 35 for the padlock may be disposed within the retainer 30c behind the body of the padlock 36.

The display card mounted retainer and packaging device of the present invention, while especially suited for padlocks of all types and sizes, can also be used to advantage to mount and display various hardware and merchandise items. The single or bi-layered display card of the assemblage carries the packaging retainer in which the merchandise is so disposed as to be accessible to the sight and feel of a prospective customer. Where the packaged item includes accessories such as keys or the like, the latter are securely held within the retainer to prevent the same from becoming separated from the displayed product. The retainer of the improved assemblage, being formed with an opening in its front wall, surrounded by a resilient lip, permits the displayed product to be snapped thereinto and to be securely held against displacement. Moreover, the improved display card mounted retainer and packaging device is of simple and novel construction, attractively packages and displays an article of merchandise, is simple to manufacture, assemble and pack, and is well adapted for the purposes described.

What is claimed as the invention is:

1. A display package, comprising a display card, and a hollow retainer mounted on a face portion of the display card and projecting outwardly therefrom, said retainer having a front face with an opening therein to receive an article to be housed within the retainer and expose a portion thereof, portions of the front face of the retainer surrounding the opening therein being yieldable and normally impinging against surface portions of the housed article.

2. A display package as claimed in claim 1 wherein the retainer has an edge flange engaging and secured to the card.

3. A display package as claimed in claim 1 wherein the base of the retainer is provided with a leg substantially registering with the lower margin of the card whereby the display package may be stood in an upright position.

4. A display package as claimed in claim 1 wherein the retainer is shaped to conform to the overall shape of the article to be housed therewithin and the opening in the front face of the retainer conforms to the size and shape of the body portion of the housed article.

5. A display package as claimed in claim 1 wherein the rear of the retainer is open but is normally covered by the card and the latter has a separable area accessible from the rear of the card which, when removed, permits the retainer-housed article to be removed from the package by being displaced rearwardly through the card opening resulting from the displacement of the separable area.

6. A display package as claimed in claim 1 wherein the front face of the retainer is formed adjacent its opening with a recess to have seated therein in an exposed condition another portion of the housed article.

7. A package-forming display card assemblage, comprising a flat card, a hollow retainer mounted on a lower face portion of the card and projecting outwardly therefrom, said retainer having a front face with a portion thereof having an enlarged opening therein edge portions of the front face of the retainer surrounding said opening being formed as yieldable lips, and an article of merchandise carried by the retainer and having a portion thereof extending through said opening in an exposed manner and being yieldingly engaged by said lips.

8. A package-forming display card assemblage as claimed in claim 7 wherein the article of merchandise is a shackle-equipped padlock whose body portion extends through the retainer opening and whose shackle is received by another portion of the retainer.

9. A package-forming display card assemblage as claimed in claim 7 wherein the flat card is bi-layered and the retainer has an edge horizontal flange which is interposed between the layers of the card.

No references cited.

THERON E. CONDON, *Primary Examiner.*

J. M. CASKIE, *Assistant Examiner.*